US012371372B2

(12) United States Patent
Tottosi (10) Patent No.: US 12,371,372 B2
(45) Date of Patent: Jul. 29, 2025

(54) APPLICATION OF BIOREMEDIATION AGENTS FORMING UNDERWATER SANCTUARY BY CORAL REEFS FROM CREMATED REMAINS

(71) Applicant: Attila Tottosi, Sarasota, FL (US)

(72) Inventor: Attila Tottosi, Sarasota, FL (US)

( * ) Notice: Subject to any disclaimer, the term of this patent is extended or adjusted under 35 U.S.C. 154(b) by 391 days.

(21) Appl. No.: 18/188,683

(22) Filed: Mar. 23, 2023

(65) Prior Publication Data

US 2023/0303439 A1    Sep. 28, 2023

Related U.S. Application Data

(60) Provisional application No. 63/324,514, filed on Mar. 28, 2022.

(51) Int. Cl.
| | |
|---|---|
| *C04B 18/06* | (2006.01) |
| *B33Y 80/00* | (2015.01) |
| *C04B 14/10* | (2006.01) |
| *C04B 24/14* | (2006.01) |
| *C04B 28/02* | (2006.01) |
| *C04B 111/00* | (2006.01) |
| *C04B 111/74* | (2006.01) |

(52) U.S. Cl.
CPC .............. *C04B 18/06* (2013.01); *B33Y 80/00* (2014.12); *C04B 14/10* (2013.01); *C04B 24/14* (2013.01); *C04B 28/02* (2013.01); *C04B 2111/00181* (2013.01); *C04B 2111/74* (2013.01)

(58) Field of Classification Search
CPC ......... C04B 18/06; C04B 14/10; C04B 24/14; C04B 28/02; C04B 2111/00181; C04B 2111/74; C04B 28/12; B33Y 80/00
See application file for complete search history.

(56) References Cited

U.S. PATENT DOCUMENTS

| | | | |
|---|---|---|---|
| 1,640,480 A | * | 8/1927 | Clark ................... B60T 15/048 |
| | | | 303/18 |
| 4,707,188 A | | 11/1987 | Tsuda et al. |
| 6,662,416 B1 | | 12/2003 | Huggins |
| 8,732,919 B1 | | 5/2014 | Malueg-Ray |

(Continued)

FOREIGN PATENT DOCUMENTS

| | | | | |
|---|---|---|---|---|
| EP | 3106446 A1 | * | 12/2016 | ............. C04B 28/10 |
| GB | 2479909 A | * | 11/2011 | ........... E04H 13/008 |

(Continued)

OTHER PUBLICATIONS

Michelle Z. Donahue, Can Underwater Resorts Actually Help Coral Reef Ecosystems?, Feb. 23, 2016, retrieved from Internet, retrieved on Mar. 22, 2023, <URL: https://www.smithsonianmag.com/innovation/can-underwater-resorts-actually-help-coral-reef-ecosystems-180958190/>.

(Continued)

*Primary Examiner* — Pamela H Weiss (57) ABSTRACT

An application and a composition of bioremediation agents and cremated remains forming underwater sanctuaries and structures by coral reefs comprising a homogenous mixture of calcium compounds, clay, cement, earthworm enzymes, and human/animal ashes. The composition will benefit nearby reefs with added calcium for rehabilitating reefs and earthworm enzymes with detoxifying properties. The underwater sanctuaries and structures will provide habitats for wildlife.

11 Claims, 8 Drawing Sheets

(56) References Cited

U.S. PATENT DOCUMENTS

| | | |
|---|---|---|
| 2006/0254035 A1 | 11/2006 | Poole |
| 2007/0266892 A1 | 11/2007 | Jarvis et al. |
| 2009/0044726 A1 | 2/2009 | Brouillette et al. |
| 2014/0013554 A1* | 1/2014 | Hojaji ................. B09B 3/35 27/1 |
| 2018/0208509 A1 | 7/2018 | Empa |
| 2022/0018078 A1 | 1/2022 | Szczepaniak et al. |

FOREIGN PATENT DOCUMENTS

| | | | | |
|---|---|---|---|---|
| WO | WO-2013172798 A1 * | 11/2013 | ............ | C04B 26/04 |
| WO | WO-2017210768 A1 * | 12/2017 | ........... | A61K 35/655 |

OTHER PUBLICATIONS

Carolyn Fortuna, New Tech For Artificial Reefs Increases Marine Life and Vitality, Sep. 25, 2020, retrieved from Internet, retrieved on Mar. 22, 2023, <URL: https://cleantechnica.com/2020/09/25/new-tech-for-artificial-reefs-increases-marine-life-vitality/>.

* cited by examiner

APPLICATION OF BIOREMEDIATION AGENTS FORMING UNDERWATER SANCTUARY BY CORAL REEFS FROM CREMATED REMAINS

The current application claims a priority to the U.S. provisional patent application Ser. No. 63/324,514 filed on Mar. 28, 2022.

FIELD OF THE INVENTION

The present invention relates to underwater structures. More specifically, the present invention integrates cremated remains into underwater structures.

BACKGROUND OF THE INVENTION

Sculptures, statues, and of the likes has existed for centuries. As time goes on, humanity gradually discovers more ancient sculptures that existed years ago. Sculptures, statues, and of the likes are primarily made for decorative purposes as they provide the surrounding area an aesthetically pleasing view rather than a bland view. Though, underwater sculptures, statues, and of the likes are extremely rare and does not necessarily serve a purpose as much as land sculptures, statues, etc.

People use to sink structures, formations on the bottom to the ocean, accidentally, or with purpose, creating objects to underwater habitat. But those objects never used material like pure calcium compounds and using cremated remains. The material that is used before, most of the time is concrete, or metal, or the new trend is ceramic. The marine life can use them, as any solid material underwater, but those materials will never be part of the ocean life The present invention is a living, breathing part of the ocean as the wildlife, fishes, microorganisms will feed on them. Also the exterior structure is able to bond carbon, and aids in rehabilitating the carbonate structure. Concrete, metal (tanks, cars, vessels, etc.) sinks to the bottom regularly with the purpose of creating artificial reef. The present invention is not like those types of artificial reefs. Concrete will remain concrete forever, while our material is the same as coral reefs that form naturally. It is known that concrete will never absorb and store carbon dioxide. However, the present invention benefits the environment as it absorbs carbon dioxide.

An objective of the present invention is to provide a unique formulation for structures, underwater sculptures, statues or similar formations. In addition, the present invention provides a formula for underwater structures, sculpture, statues, or similar formations that benefits the surrounding wildlife. Furthermore, the present invention provides a method of disposing ash without pollution.

DETAIL DESCRIPTIONS OF THE INVENTION

All illustrations of the drawings are for the purpose of describing selected versions of the present invention and are not intended to limit the scope of the present invention.

The specification includes references to "alternative embodiment" or "alternative embodiments" which do not necessarily refer to the same embodiment.

"First", "second" etc. as contained herein are terms used as labels for nouns that they precede and do not imply ordering.

Figure 1:
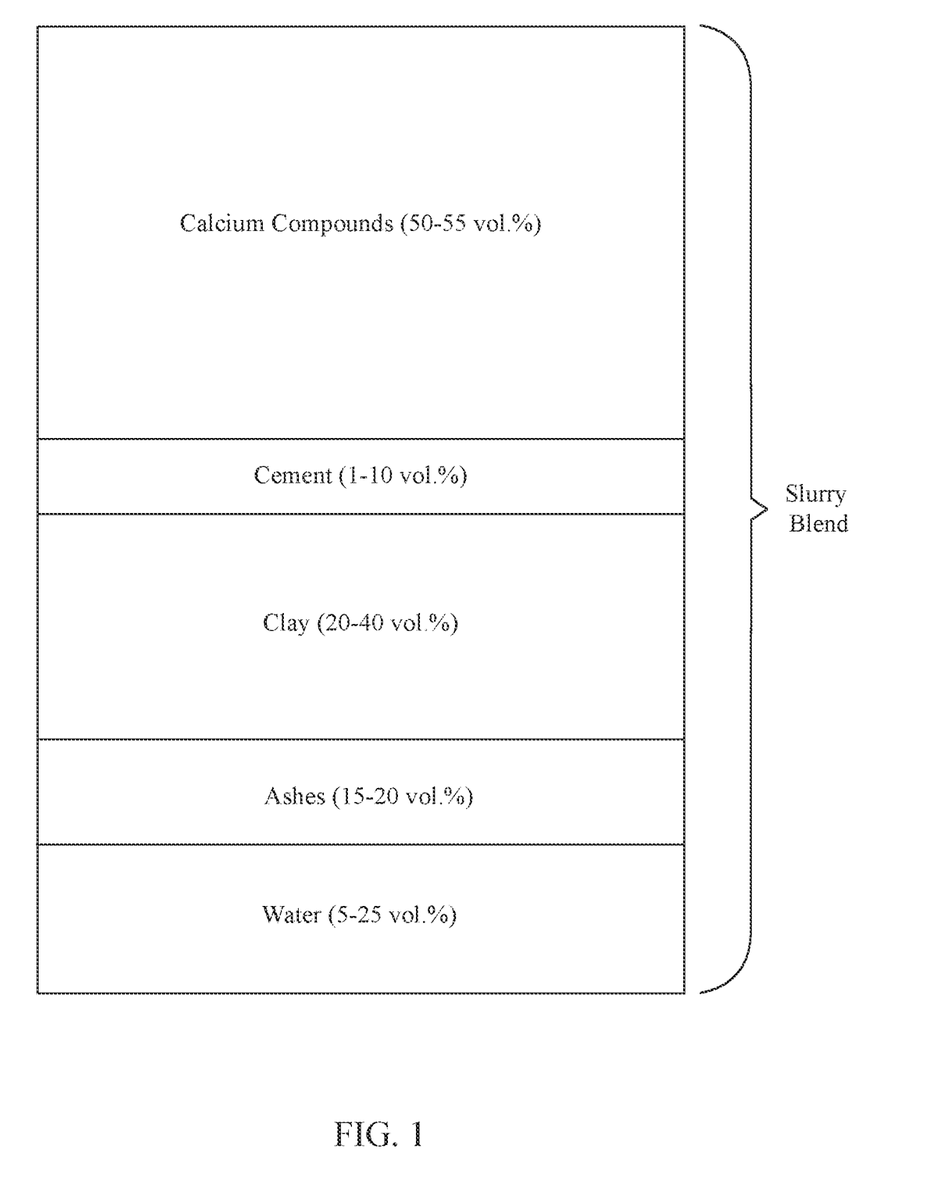
FIG. 1 is a chart listing ratio of ingredients of the slurry blend in the first preferred embodiment.

The present invention provides a unique formulation of ingredients for underwater structures, sculptures, statues, or similar formations. In addition, the present invention provides a formula for underwater sculpture, statues, or of the likes that benefits the surrounding wildlife. The present invention helps detoxify and provide minerals to help revitalize the coral reefs. The present invention helps balance the pH of the water which also benefits the coral reef by reducing the acidity of the water where the acidity if left untreated degrades the coral reefs and the life sustained. Depending on the acidity, the components of the present invention can be adjusted for the water conditions present at the location of the underwater structure(s). Furthermore, the present invention provides a method of disposing ash without pollution. As shown in FIG. 1, the present invention comprises a quantity of ashes, a quantity of pure calcium compounds, a quantity of clay, a quantity of cement, and a quantity of water.

The quantity of ashes are solid remnants of an object broken down by fire or by resomation. In the first preferred embodiment, the quantity of ashes used within the present invention comprises human bone broken down either by cremation or by resomation. Between 15 percentage of volume (vol. %) to 20 vol. % of the present invention is made of the quantity of ashes of remnants of human bone. For example, if there is a 10-kilogram structure, then it may contain an average of 2 kilograms of ashes. The human bone contain certain trace elements that could be harmful to the natural environment such as sodium and the human bone are also alkaline. The other components of the present invention help neutralize these trace elements and helps balance the pH of the surrounding water.

The quantity of pure calcium compounds is one ingredient within the present invention that has beneficial environmental effects. Calcium within the quantity of pure calcium compounds provides the surrounding wildlife and environment calcium to consume. Between 50 vol. % to 55 vol. % of the present invention is made of the quantity of pure calcium compounds. The present invention uses a formula as a temporarily hydrophobic substance. In its original state, it is a powdery formula and can be applied on the bottom of a body of water, but the powder stays dry. The quantity of pure calcium compounds comprises a quantity of quicklime, a quantity of oil, a quantity of detergent, and a quantity of rubbing alcohol. The quantity of quicklime provides a supply of calcium that absorbs oily and toxic substances. The quantity of quicklime is between 52.25 vol. % of the pure calcium compounds. Part of the calcium will be consumed and dissolved in the aquatic environment over time, but the stability of the structure secured by the other components. The calcium contained in the quantity of the pure calcium compounds will be replenished by calcium carbonate structures. The pure calcium compounds contribute to the healing of the coral reefs' exterior carbonate structure, which is demolished by acidification. Part of the pure calcium compounds will be help rebuild and will be built-in the coral reefs' exterior structure and substrate. The quantity of oil can be a quantity of either corn oil or canola oil. The quantity of oil encapsulates the water-soluble quantities thereby helping form the temporarily hydrophobic substance. The quantity of oil is between 2.61 vol. % to 7.84 vol. % of the pure calcium compounds. The quantity of detergent and the quantity of rubbing alcohol helps the chemical reactions between the ingredients and thoroughly detoxify surfaces. The quantity of detergent is between 0.18 vol. % to 0.21 vol. % of the pure calcium compounds. The quantity of rubbing alcohol is between 5.22 vol. % to 10.45 vol. % of the pure calcium compounds. In the first preferred embodiment, the quantity of water comprises distilled water. The quantity of water is between 5 vol. % to 25 vol. % of the present invention. Alternate embodiments can include rainwater, and even tap water.

Clay is another primary ingredient within the present invention that has beneficial environmental effects. In addition, the quantity of clay is used within the present invention as an ingredient that provides stability. The quantity of clay assists with structurally holding and containing the shape and structure of the present invention alongside the quantity of cement. The quantity of clay is between 20 vol. % to 40 vol. % of the composition. In the first preferred embodiment, the quantity of clay is marine clay. The marine clay is for environmental purposes as the marine clay will not harm the oceans and may help balance the aquatic environments. The quantity of clay comprises between 53 vol. % to 58 vol. % of silt particles, between 20 vol. % to 25 vol. % of sand particles, and 20 vol. % to 25% of clay particles. Sand particles comprise mineral particles between 0.05 mm to 4.75 mm in diameter. Silt particles comprise mineral particles of size between 0.05 mm to 0.002 mm in diameter. The clay particles comprise mineral particles less than 0.002 mm in diameter.

The quantity of cement of the present invention is utilized as an assistance for stability. Cement, typically composed of mineral oxides, is a material that sets, hardens, and adheres to other materials to bind them together. It is usable when wet or dry and can be used as a filling substance to repair cracks or voids in solid materials such as stone, cinder block (mortar), concrete, bricks, concrete blocks, ceramics and pottery. In the case of the present invention, the quantity of cement is used alongside the quantity of clay to harden and structurally hold and retain the shape of the present invention together. In the present invention, the quantity of cement is between 1 vol. % to 10 vol. % of the composition. In the first preferred embodiment, the quantity of cement is marine grade cement. This type of cement is resistant to degradation in a saltwater environment. The quantity of marine cement comprises cement clinker, gypsum, and ground granulated furnace slag. The cement clinker is between 20 vol. % to 90 vol. % of the quantity of cement. The gypsum is less than 5 vol. % of the quantity of marine cement. The ground granulated furnace slag is less than 80% of the quantity of cement. Cement clinker comprises limestone and aluminosilicate materials. The limestone is between 60 vol. % to 80 vol. % of the cement clinker and aluminosilicate minerals are between 20 vol. % to 40 vol. % of the cement clinker.

Figure 2:
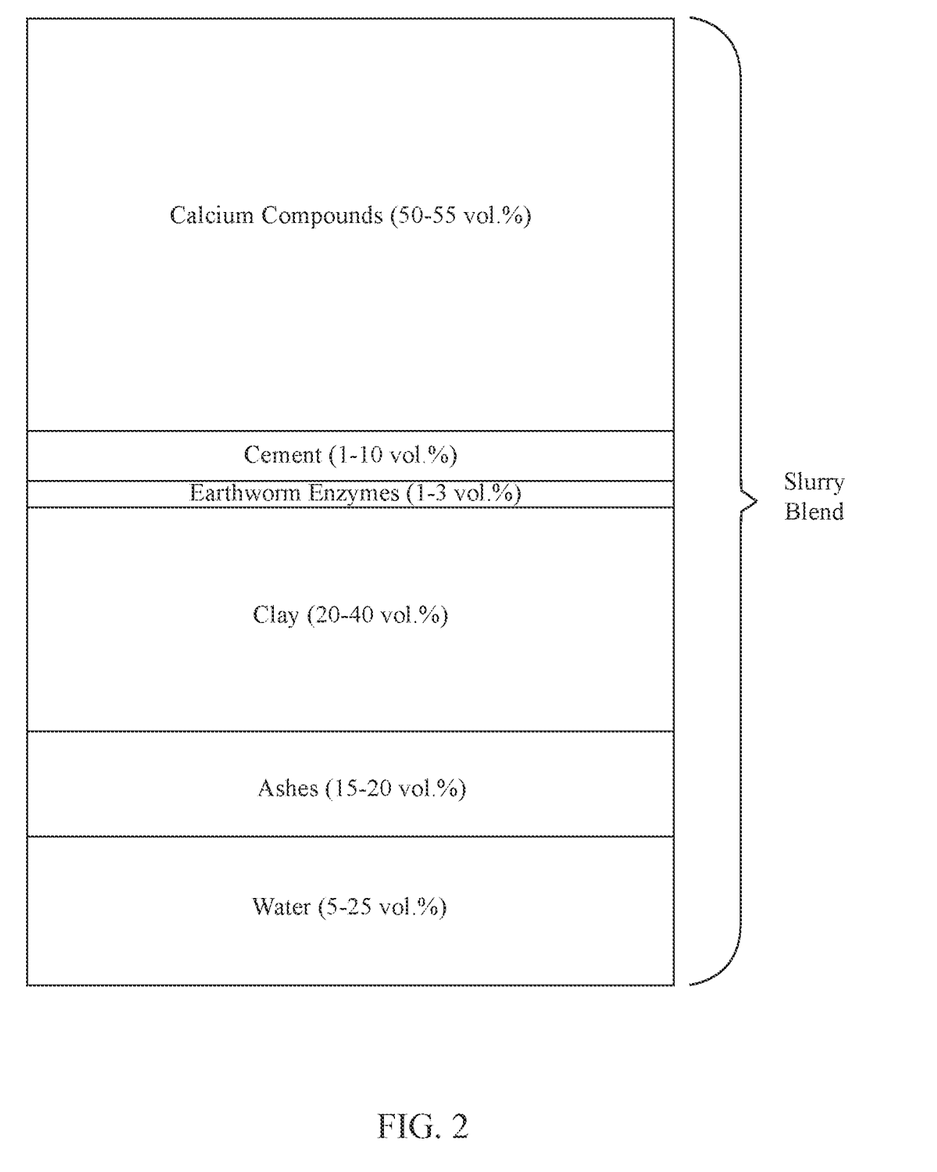
FIG. 2 is a chart listing ratio of ingredients of the slurry blend in the second preferred embodiment.
Figure 3:
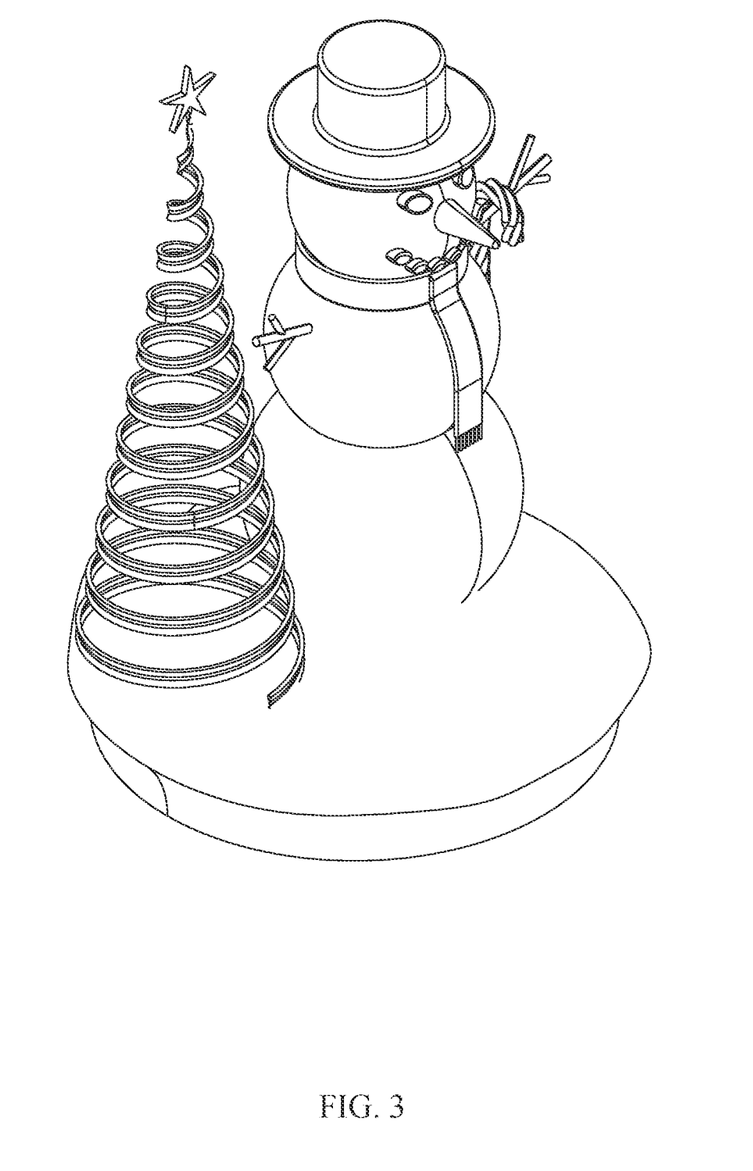
FIG. 3 is a top perspective view of the present invention configured into a snowman structure.
Figure 4:
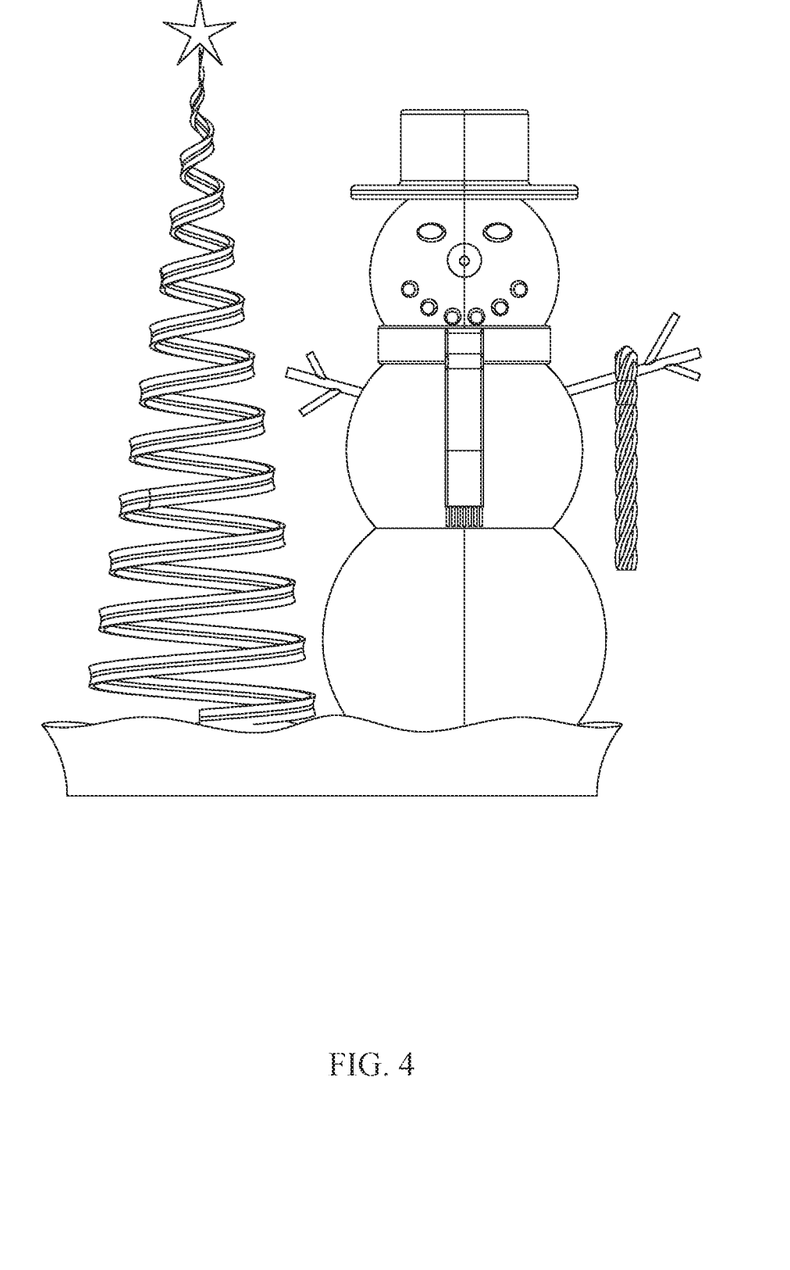
FIG. 4 is a front view of the present invention configured into a snowman sculpture.
Figure 5:
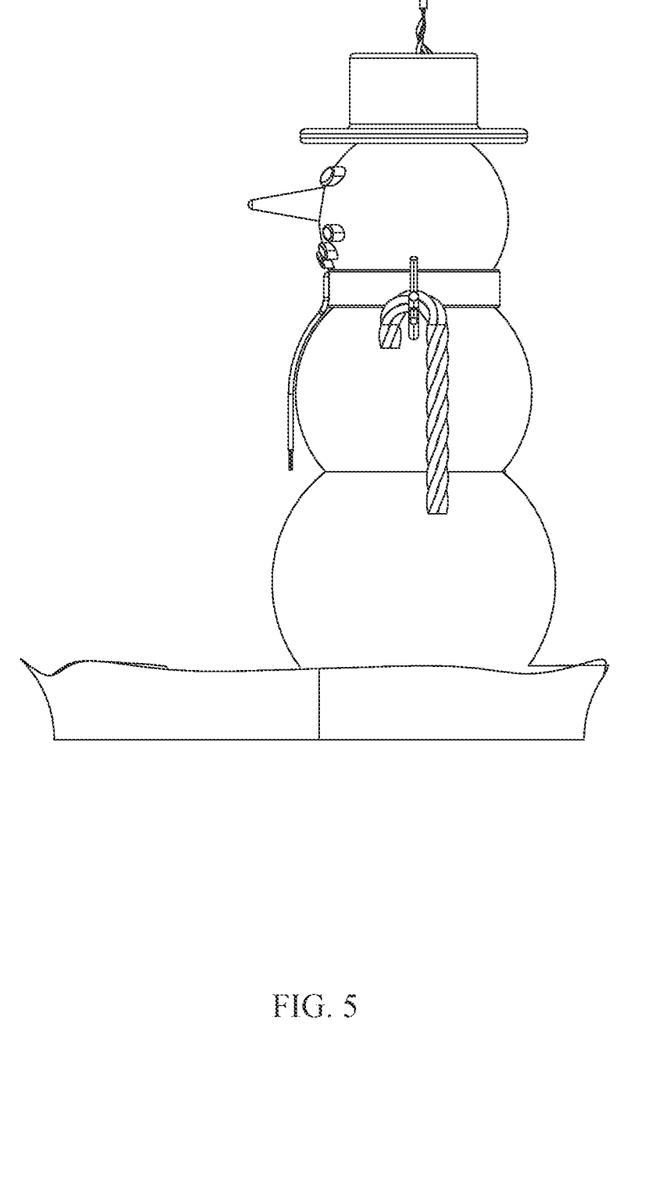
FIG. 5 is a side view of the present invention configured into a snowman sculpture.
Figure 6:
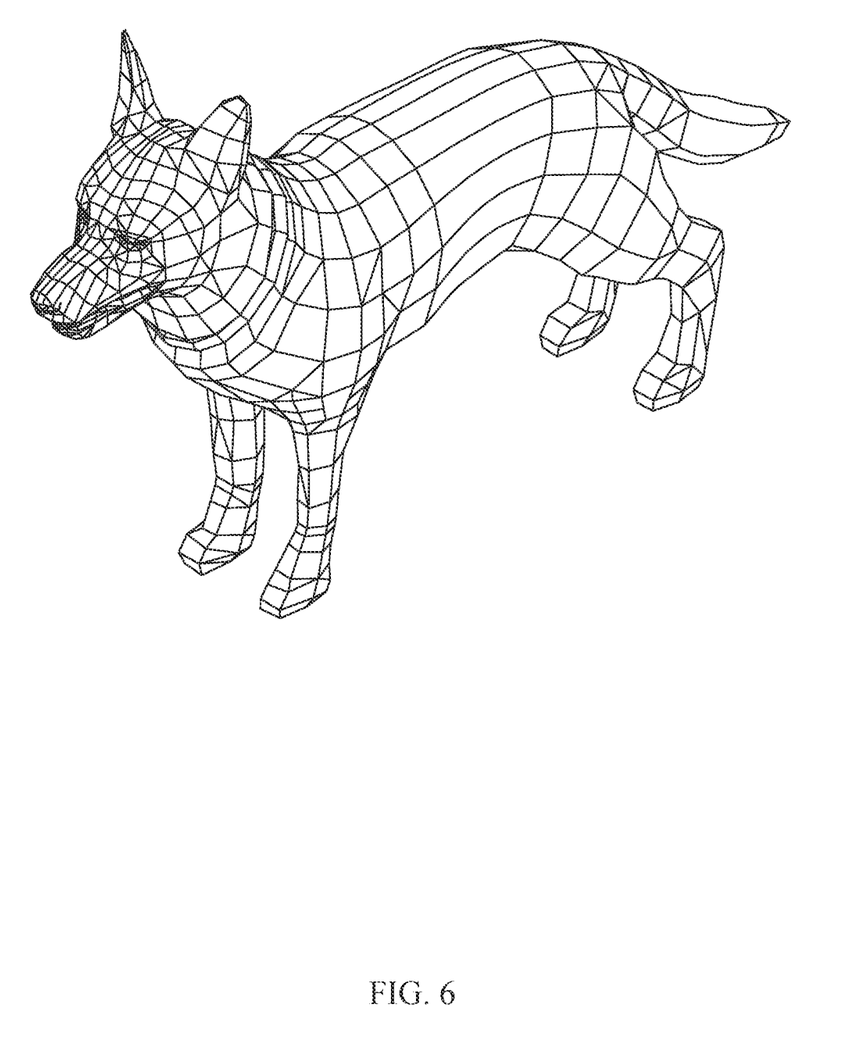
FIG. 6 is a top perspective view of the present invention configured into a sculpture of a dog.
Figure 7:
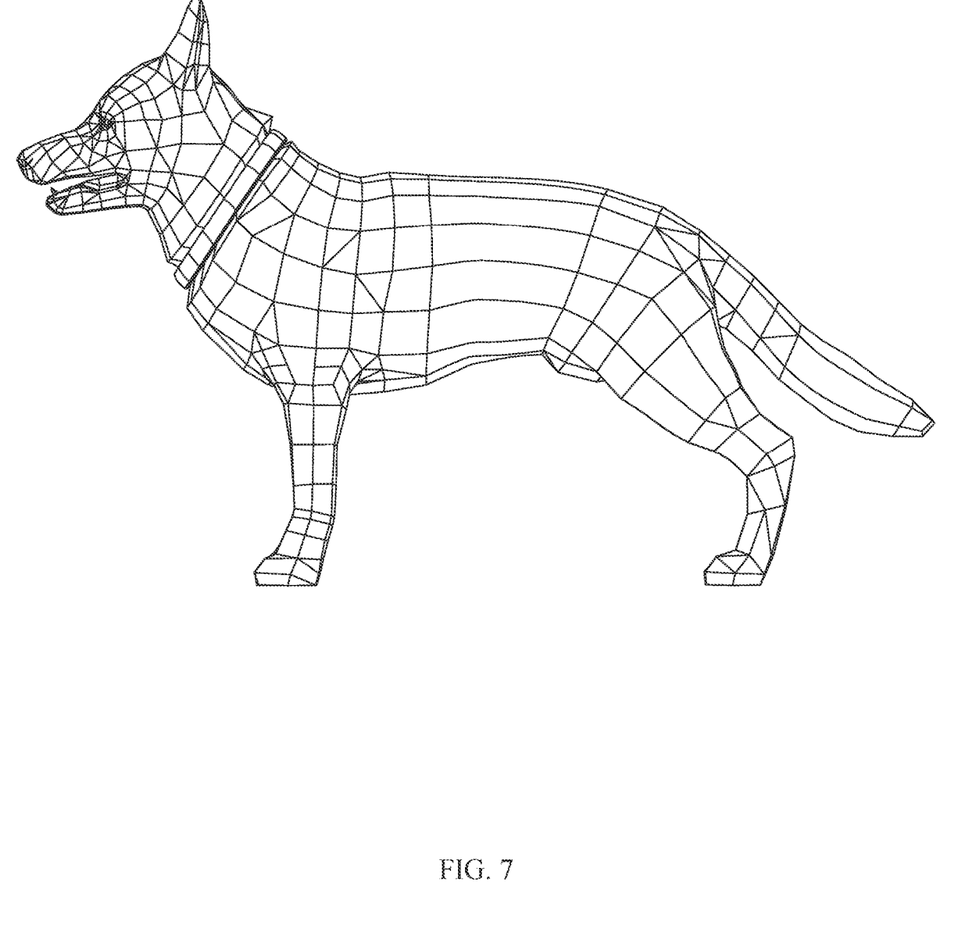
FIG. 7 is a side view of the present invention configured into a sculpture of a dog.
Figure 8:
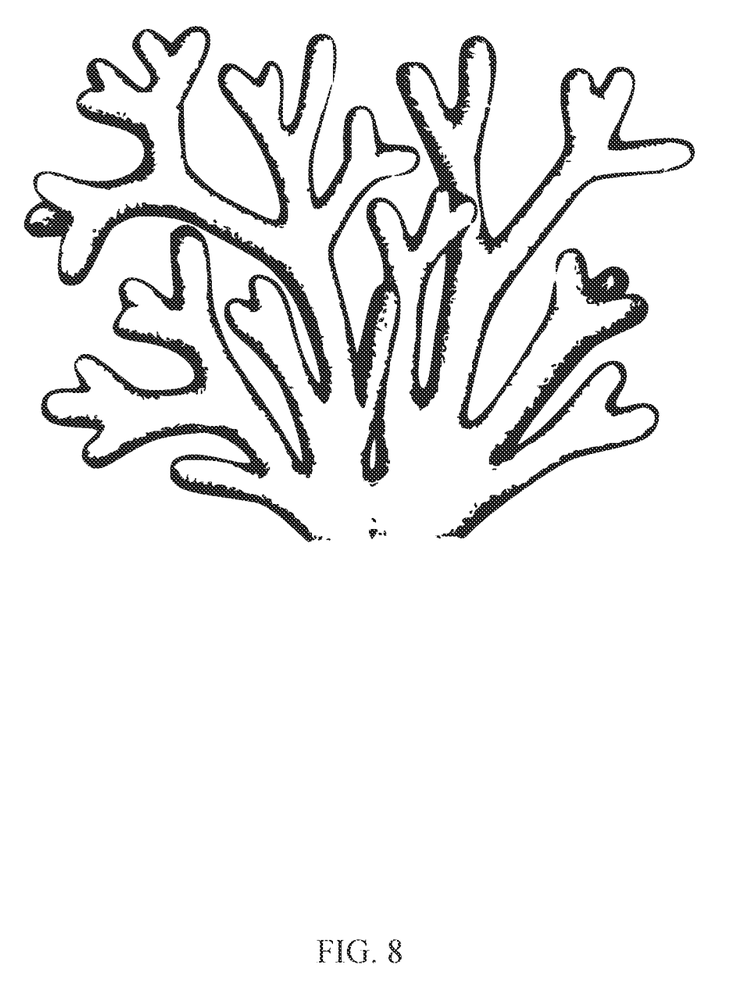
FIG. 8 is a sketch of the present invention configured into a sculpture of a coral reef.

In the second preferred embodiment as shown in FIG. 2, the present invention comprises a quantity of earthworm enzymes in addition to the quantities from the first preferred embodiment. The earthworm enzyme supports detoxification and regenerative process. The quantity of earth worm enzymes reduces sodium and brine and also slightly reduces alkalinity and pushed the pH toward neutral. The quantity of earthworm enzymes can also neutralize and biodegrades any oily substance. The enzymes are produced by earthworms and harvested. The quantity of earthworm enzymes is between 1 vol. % to 3 vol. % of the present invention. The earthworm enzymes comprise nitrate reductase, acid phosphatase, and alkaline phosphatase and are produced from castings of Californian *Eisenia Foetida* species of earthworm. The castings comprise of earthworm waste and are a form of organic fertilizer.

The present invention considers ranges of the ingredients. This is so the quantities can be adjusted based on water conditions. The main water condition that needs to be adjusted for is acidity. The quantity of ashes is slightly alkaline while the quantity of pure calcium compounds are alkalinizing agents. The components of the present invention are adjusted before mixing to ensure that the underwater structures will have an environmental benefit and help balance the pH of the surrounding water. If the water is acidic then the pure calcium compounds will be between 52 vol. % to 55 vol. % of the slurry blend. The quantity of ashes can also be adjusted to the high end of the range if the water is acidic. If the water is acidic then the quantity of ashes will be between 17 vol. % to 20 vol. %. The stability of the underwater structures is important to ensure that the underwater structures will endure. If the local water conditions are more turbulent then the quantity of clay and the quantity of cement can be increased to the high end of the ranges with the other ingredients being reduced accordingly. If the water is turbulent then the quantity of clay is between 30 vol. % to 40 vol. % and the quantity of cement is between 5 vol. % to 10 vol. %.

The present invention is utilized to produce sculptures, statues, etc. to be placed underwater. The present invention may produce any form and/or shape of structure, sculpture, statue, etc. The present invention is eco-friendly and provides beneficial environmental effects. The calcium within the present invention provides the surrounding wildlife and area nutrients. The quantity of cement is used as an additional ingredient to assist the stability of the present invention in order to retain and hold the structural shape. The present invention provides a method to dispose of ash alongside benefitting the environment. The present invention provides a method to dispose of human/animal ash than the traditional method of throwing ashes onto the surface of the ocean. In addition, the present invention will provide structures, sculptures, statues, etc. that will retain nutrients and slowly degrade as underwater wildlife gradually consume the nutrients. Underwater wildlife such as fishes, algae, microorganisms, etc. The present invention also contributes to combat against acidification because calcium is alkaline and balances the potential of hydrogen (pH) scale of the water.

To use the present invention, the user will obtain the forementioned ingredients: the quantity of ashes, the quantity of pure calcium compounds, the quantity of clay, the quantity of cement, and the quantity of water. The user will mix the quantity of pure calcium compounds, the quantity of ashes, the quantity of clay, the quantity of cement, and the quantity of water until homogenously mixed into a slurry blend. Once the slurry blend is made, the user will form the slurry blend into any structure, sculpture, statue, etc. that they are planning to place into the ocean. In an alternate embodiment, the quantity of earthworm enzymes is further homogeneously mixed into the slurry blend. The user will form the structure, sculpture, statue, etc. and allow for it to dry completely. The structure, sculpture, statues, etc. can be of any shape and form and the formation of the structure, sculpture, statues, etc. can be carried out with 3-D printing or pressing technology or similar methods for forming a slurry into a structure. 3-D printing of the structure, sculpture, or statues can be accomplished with a 3-D concrete printer. Pressing technology is carried out by creating a mold (or molds for large projects) and pressing the slurry blend into the mold(s), placing the molds in the preferred pattern, if there are multiple molds, and allowing to dry. Several examples are shown in FIGS. 3 through 8 but are not meant to be limiting. Once dried thoroughly, the user will place the structure, sculpture, statue, etc. to their desired location onto the ground floor of the ocean. The present invention will gradually degrade and sustain wildlife nearby.

Although the invention has been explained in relation to its preferred embodiment, it is to be understood that many other possible modifications and variations can be made without departing from the spirit and scope of the invention. The invention provides comprehensive forms to Circle of Life, Dust-to-Dust, when deceased living organisms becomes part of life after their death.

What is claimed is:

1. The composition for underwater structures comprising:
A slurry blend comprising a quantity of pure calcium compounds,
a quantity of ashes,
a quantity of clay,
a quantity of cement,
a quantity of water, and
a quantity of earthworm enzymes.

2. The composition for underwater structures claimed in claim 1 comprising:
the quantity of earthworm enzymes being between 1 vol. % to 3 vol. % of the slurry blend.

3. The composition for underwater structures claimed in claim 2 comprising:
the quantity of pure calcium compounds being between 50 vol. % to 55 vol. % of the slurry blend.

4. The composition for underwater structures claimed in claim 3 comprising:
the quantity of ash being between 15 vol. % to 20 vol. % of the slurry blend.

5. The composition for underwater structures claimed in claim 4 comprising:
the quantity of clay being between 20 vol. % to 40 vol. % of the slurry blend.

6. The composition for underwater structures claimed in claim 5 comprising:
the quantity of cement being between 1 vol. % to 10 vol. % of the slurry blend.

7. The composition for underwater structures claimed in claim 6 comprising:
the quantity of water being between 5 vol. % to 25 vol. % of the slurry blend.

8. A structure formed from the composition of claim 1 wherein the slurry is formed into a structure using 3D printing.

9. A structure formed from the composition of claim 1 wherein the slurry is formed into a structure using pressing technology.

10. A structure formed from the composition of claim 7 wherein the slurry is formed into a structure using 3D printing.

11. A structure formed from the composition of claim 7 wherein the slurry is formed into a structure using pressing technology.

* * * * *